United States Patent
Hara et al.

(10) Patent No.: US 9,683,657 B2
(45) Date of Patent: Jun. 20, 2017

(54) BIASING FORCE ADJUSTMENT DEVICE, HYDRAULIC CONTROL VALVE HAVING THE SAME, AND METHOD OF MANUFACTURING BIASING FORCE ADJUSTMENT DEVICE

(71) Applicant: DENSO CORPORATION, Kariya, Aichi-pref. (JP)

(72) Inventors: Tetsuya Hara, Kariya (JP); Norihisa Achiha, Chita-gun (JP); Hiroyuki Nakane, Okazaki (JP); Masaki Aihara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/537,374

(22) Filed: Nov. 10, 2014

(65) Prior Publication Data
US 2015/0129072 A1    May 14, 2015

(30) Foreign Application Priority Data

Nov. 11, 2013 (JP) .................................. 2013-233155
Dec. 4, 2013 (JP) .................................. 2013-251190

(51) Int. Cl.
F15B 13/043 (2006.01)
F16H 61/02 (2006.01)
F16K 31/06 (2006.01)

(52) U.S. Cl.
CPC ..... *F16H 61/0251* (2013.01); *F16K 31/0613* (2013.01); *F16H 2061/0253* (2013.01); *Y10T 29/49609* (2015.01); *Y10T 137/86622* (2015.04)

(58) Field of Classification Search
CPC ....... Y10T 29/49609; Y10T 137/86622; F16H 2061/0253; F16H 61/0251; F16K 11/07;
(Continued)

(56) References Cited

U.S. PATENT DOCUMENTS 1,780,675 A * 11/1930 Hewitt .................. F16B 39/023
411/271
2,036,550 A    4/1936 Stevens
(Continued)

FOREIGN PATENT DOCUMENTS

JP    H09-166238    6/1997
JP    2012-220013    11/2012

OTHER PUBLICATIONS

Office Action (2 pages) dated Nov. 5, 2015, issued in corresponding Japanese Application No. 2013-251190 and English translation (2 pages).

*Primary Examiner* — Craig J Price
(74) *Attorney, Agent, or Firm* — Nixon & Vanderhye P.C.

(57) ABSTRACT

A biasing force adjustment device includes: a cylindrical component having a first thread part; a reciprocate component accommodated in the cylindrical component; a biasing portion that biases the reciprocate component in a first direction; and a biasing force adjustment component that adjusts a biasing force of the biasing portion. The biasing force adjustment component has a second thread part engaged with the first thread part so as to control the position of the biasing force adjustment component relative to the cylindrical component, and a regulation part that regulates movement of the biasing force adjustment component relative to the cylindrical component by being deformed in a radial direction by external force applied in the first direction.

2 Claims, 10 Drawing Sheets

(58) Field of Classification Search
CPC ... F16K 31/0613; F16B 35/005; F16B 39/023
USPC .......... 137/625.64, 315.03, 315.09, 315.27,
137/15.18, 15.21; 411/402, 403, 924.1,
411/937.2, 938; 285/382.4, 382.5, 382.7,
285/39
See application file for complete search history.

(56) References Cited

U.S. PATENT DOCUMENTS

| | | | | |
|---|---|---|---|---|
| 2,637,361 | A * | 5/1953 | Nagel | F16B 39/284 411/259 |
| 3,925,876 | A * | 12/1975 | Curtis | B21D 39/03 411/271 |
| 4,605,197 | A * | 8/1986 | Casey | F15B 13/0438 137/625.64 |
| 4,838,313 | A * | 6/1989 | Kobayashi | G05D 16/2013 137/625.65 |
| 4,838,517 | A * | 6/1989 | Miki | G05D 16/2013 137/625.65 |
| 4,838,518 | A * | 6/1989 | Kobayashi | G05D 16/2013 137/625.65 |
| 4,966,195 | A * | 10/1990 | McCabe | F16H 61/0251 137/625.61 |
| 4,971,116 | A * | 11/1990 | Suzuki | H01F 7/1638 137/625.65 |
| 5,004,440 | A * | 4/1991 | Suzuki | G05D 16/2013 137/625.65 |
| 5,011,352 | A * | 4/1991 | Hatter | B25B 13/48 411/271 |
| 5,014,747 | A * | 5/1991 | Suzuki | G05D 16/2013 137/625.65 |
| 5,197,507 | A * | 3/1993 | Miki | G05D 16/2013 137/625.65 |
| 5,249,414 | A * | 10/1993 | Iwata | D02G 3/328 257/E29.162 |
| 5,848,613 | A * | 12/1998 | Sakaguchi | F15B 13/0402 137/625.65 |
| 5,868,167 | A * | 2/1999 | Miki | F16H 61/0251 137/625.65 |
| 5,947,155 | A * | 9/1999 | Miki | G05D 16/2013 137/625.65 |
| 6,408,883 | B2 * | 6/2002 | Motoki | F15B 13/043 137/625.64 |
| 6,498,416 | B1 * | 12/2002 | Oishi | F02M 51/0614 310/214 |
| 6,918,571 | B1 * | 7/2005 | Rose | F16K 31/0613 251/129.15 |
| 6,953,186 | B2 * | 10/2005 | Kaneda | F16K 39/04 251/129.15 |
| 6,987,437 | B2 * | 1/2006 | Matsusaka | H01F 7/1607 335/220 |
| 7,275,903 | B2 * | 10/2007 | Schultz | F16B 23/0038 411/395 |
| 7,909,060 | B2 * | 3/2011 | Yamamoto | G05D 16/2026 137/625.6 |
| 7,938,143 | B2 * | 5/2011 | Nagasaki | F16K 31/0613 137/625.65 |
| 7,950,416 | B2 * | 5/2011 | Nakai | F16H 61/0251 137/625.65 |
| 8,082,953 | B2 * | 12/2011 | Dayton | F16K 31/0613 137/625.65 |
| 8,109,487 | B2 * | 2/2012 | Kokubu | F16K 31/0613 251/129.15 |
| 8,418,724 | B2 * | 4/2013 | Suzuki | F15B 13/0402 137/625.64 |
| 8,707,994 | B2 * | 4/2014 | Mizui | F15B 13/0402 137/625.25 |
| 2001/0009164 | A1 | 7/2001 | Motoki et al. | |
| 2003/0038260 | A1 * | 2/2003 | Matsusaka | F16K 31/0624 251/129.15 |
| 2005/0279957 | A1 * | 12/2005 | Inami | F16K 27/041 251/129.15 |
| 2009/0129888 | A1 * | 5/2009 | Hung | F16B 35/06 411/393 |
| 2010/0154602 | A1 * | 6/2010 | Piper | B25B 13/065 81/121.1 |
| 2010/0326552 | A1 * | 12/2010 | Suzuki | F15B 13/0402 137/625.64 |
| 2012/0291900 | A1 * | 11/2012 | Mizui | F15B 13/0402 137/625.64 |
| 2013/0161550 | A1 * | 6/2013 | Hirano | F16K 1/523 251/285 |
| 2014/0054485 | A1 * | 2/2014 | Tomita | F16K 31/0613 251/318 |
| 2014/0361205 | A1 * | 12/2014 | Lippert | F16K 31/06 251/112 |
| 2015/0247585 | A1 * | 9/2015 | Takanishi | F16K 31/0613 251/129.15 |

* cited by examiner

SECOND DIRECTION ← → FIRST DIRECTION

SECOND DIRECTION ← → FIRST DIRECTION

SECOND DIRECTION ← → FIRST DIRECTION

SECOND DIRECTION ← → FIRST DIRECTION

BIASING FORCE ADJUSTMENT DEVICE, HYDRAULIC CONTROL VALVE HAVING THE SAME, AND METHOD OF MANUFACTURING BIASING FORCE ADJUSTMENT DEVICE

CROSS REFERENCE TO RELATED APPLICATION

This application is based on Japanese Patent Application No. 2013-233155 filed on Nov. 11, 2013 and Japanese Patent Application No. 2013-251190 filed on Dec. 4, 2013, the disclosures of which are incorporated herein by reference in their entirety.

TECHNICAL FIELD

The present disclosure relates to a biasing force adjustment device, a hydraulic control valve having the biasing force adjustment device, and a method of manufacturing a biasing force adjustment device.

BACKGROUND

A hydraulic control module for an automatic shift switches the shift range of the automatic shift by controlling the pressure of operation oil supplied to the clutch of the automatic shift. The hydraulic control module is equipped with a pump which supplies operation oil, a hydraulic control valve which controls the pressure of operation oil, and a control part which controls the hydraulic control valve. The hydraulic control valve includes a sleeve which has a passage communicating to the pump and the clutch, a spool accommodated in the sleeve, and an actuator which actuates the spool to reciprocate in the sleeve. When the spool reciprocates in the sleeve, the pressure of operation oil supplied to the clutch is controlled by the connection state between the sleeve and the pump.

The hydraulic control valve further includes a spring which produces biasing force act on the spool and a biasing force adjustment component which adjusts the biasing force by adjusting the position relative to the sleeve at a time manufacturing the hydraulic control valve.

JP H09-166238A describes a hydraulic control valve for an automatic shift, and the hydraulic control valve includes a biasing force adjustment component. The biasing force adjustment component has a male thread part engaged with a female thread part of a sleeve. After adjusting biasing force of a spring, the biasing force adjustment component is deformed inward in the radial direction, such that the position of the biasing force adjustment component is fixed relative to the sleeve.

JP 2012-220013A describes a hydraulic control valve for an automatic shift, in which firstly the biasing force of a spring is adjusted by deforming the sleeve inward in the radial direction in a first deformation process, then further deforming the sleeve inward in the radial direction in a second deformation process to set the position of the biasing force adjustment component, such that the position of the biasing force adjustment component is fixed relative to the sleeve.

There is a clearance between a flank defining the male thread of the male thread part of the biasing force adjustment component and a flank defining the female thread of the female thread part of the sleeve, such that the biasing force adjustment component is rotatable.

For this reason, in JP H09-166238A, when deforming the biasing force adjustment component, a position at which the male thread part and the female thread part are engaged with each other may be deviated from a position set for adjusting the biasing force. In this case, it is difficult to accurately adjust the biasing force of the spring.

Moreover, in JP 2012-220013A, after the first deformation process, there is still a clearance between the flank of the male thread part of the biasing force adjustment component and the flank of the female thread part of the sleeve. So, in the second deformation process, a position at which the male thread part and the female thread part are engaged with each other may be deviated from that in the first deformation process for adjusting the biasing force. In this case, it is difficult to accurately adjust the biasing force of the spring.

SUMMARY

It is an object of the present disclosure to provide a biasing force adjustment device that can accurately adjust biasing force acting on a component accommodated to reciprocate in a cylindrical component.

It is an object of the present disclosure to provide a hydraulic control valve having the biasing force adjustment device, and a method of manufacturing the biasing force adjustment device.

According to an aspect of the present disclosure, a biasing force adjustment device includes: a cylindrical component having a first thread part; a reciprocate component accommodated to reciprocate in the cylindrical component; a biasing portion that biases the reciprocate component in a first direction along a central axis of the cylindrical component; and a biasing force adjustment component that adjusts a biasing force of the biasing portion in the cylindrical component. The biasing force adjustment component has a second thread part engaged with the first thread part of the cylindrical component so as to control the position of the biasing force adjustment component relative to the cylindrical component, and a regulation part to regulate movement of the biasing force adjustment component relative to the cylindrical component by being deformed in a radial direction by external force applied in the first direction.

According to an aspect of the present disclosure, a method of manufacturing a biasing force adjustment device includes: adjusting a biasing force of a biasing portion; and deforming a biasing force adjustment component. In the adjusting of the biasing force of the biasing portion, the biasing force of the biasing portion applied to a reciprocate component by adjusting the position of the biasing force adjustment component relative to a cylindrical component, while a force is applied to the biasing force adjustment component in a first direction along a central axis of the cylindrical component against the biasing force of the biasing portion. After the adjusting of the biasing force of the biasing portion, in the deforming of the biasing force adjustment component, the biasing force adjustment component is deformed in the radial direction by applying an external force on the biasing force adjustment component while a force is applied to the biasing force adjustment component against the biasing force of the biasing portion.

Accordingly, the biasing force adjustment component which adjusts the biasing force of the biasing portion has the second thread part engaged with the first thread part of the cylindrical component, and the regulation part that is deformed outward in the radial direction by external force. After adjusting the position of the biasing force adjustment component relative to the reciprocate component so that the biasing force of the biasing portion is controlled to have a desired value, when the external force is applied on the biasing force adjustment component in the first direction, the regulation part is deformed outward in the radial direction, and is regulated from moving relative to the reciprocate component.

When deforming the regulation part, the force is applied to the biasing force adjustment component in the same direction as the force acting on the biasing force adjustment component when adjusting the biasing force. Therefore, the position of the biasing force adjustment component relative to the cylindrical component does not change compared with the time of adjusting the biasing force. Thus, the position of the biasing force adjustment component can be restricted from being deviated from the position of the biasing force adjustment component at a time of adjusting the biasing force, while there is a clearance between a flank of the thread of the first thread part and a flank of the thread of the second thread part. Accordingly, the biasing force acting on the reciprocate component can be accurately controlled to have a predetermined value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
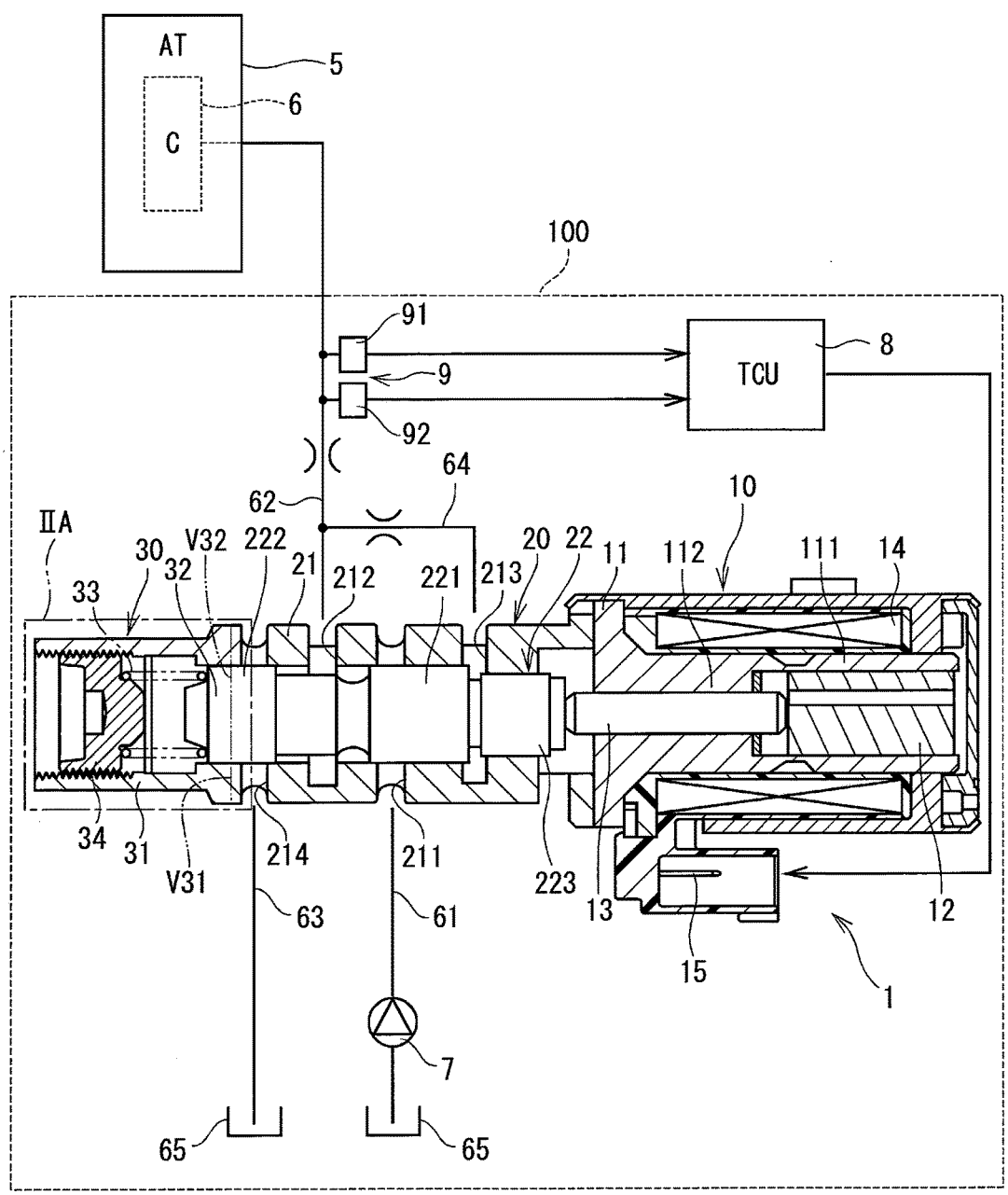
FIG. 1 is a schematic view illustrating a hydraulic control system for an automatic shift using a biasing force adjustment device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A hydraulic control module 100 for an automatic shift 5 is shown in FIG. 1 in which a biasing force adjustment device according to a first embodiment is used. The biasing force adjustment device is provided, for example, in a control valve 1 that is an electromagnetic hydraulic type control valve as a hydraulic control valve applied to the hydraulic control module 100 which controls the pressure of oil supplied to the automatic shift 5 for a vehicle. The hydraulic control module 100 controls the pressure of operation oil, and supplies the operation oil to the automatic shift 5 that changes gear ratio stepwise using plural gears in the transmission of power. The automatic shift 5 includes plural clutches 6, each of which corresponding to a friction element that operates according to the pressure of the operation oil supplied from the hydraulic control module 100. FIG. 1 shows only one of the clutches for convenience.

The hydraulic control module 100 includes a pump 7, a transmission control unit (hereafter called as TCU) 8, a sensor 9, and the like in addition to the control valve 1. The control valve 1 is provided to the respective clutch 6. The TCU 8 is electrically connected with the control valve 1. FIG. 1 shows only one of the control valves for convenience.

The pump 7 draws and pressurizes operation oil currently stored in an oil pan 65. The pump 7 adjusts the pressure of operation oil to have a predetermined line pressure, and supplies the operation oil to a pressure controlling part 20 of the control valve 1.

The control valve 1 controls the pressure of operation oil outputted to the clutch 6. The control valve 1 has an electromagnetic actuator 10, the pressure controlling part 20, and a biasing force adjustment part 30. The electromagnetic actuator 10 may correspond to an actuator, and the biasing force adjustment part 30 may correspond to a biasing force adjustment device. The operation oil supplied from the pump 7 is adjusted to have a target output oil pressure by the pressure controlling part 20, and is supplied to the clutch 6. Excess oil generated when adjusting the oil pressure in the pressure controlling part 20 is returned to the oil pan 65. Details of the control valve 1 are mentioned later.

The electromagnetic actuator 10 controls the pressure controlling part 20 that controls the oil pressure. The actuator 10 produces electromagnetic attraction power by being supplied with a drive current based on an instruction current value instructed from the TCU 8. The pressure controlling part 20 is controlled by the electromagnetic attraction power generated by the electromagnetic actuator 10.

The pressure controlling part 20 is driven by the actuator 10, and adjusts the output oil pressure. The pressure controlling part 20 is connected to the pump 7, the clutch 6, and the oil pan 65.

The TCU 8 includes a microcomputer and a drive circuit, and executes a shift control process. The TCU 8 is connected to an oil pressure sensor 91, an oil temperature sensor 92, a throttle opening sensor (not shown), an engine speed sensor (not shown), a turbine speed sensor (not shown), a range sensor (not shown), and a vehicle speed sensor (not shown), each of which acquires various operation information necessary for performing the shift control process. The oil pressure sensor 91 detects the oil pressure of the operation oil flowing through a connection passage 62. The oil temperature sensor 92 detects the temperature of the operation oil flowing through the connection passage 62.

The microcomputer of the TCU 8 computes the value of target output oil pressure by executing various control programs memorized by the memory, and further computes the instruction current value. The drive circuit produces an instruction current for driving the actuator 10 of the control valve 1 based on the computed instruction current value.

Details of the control valve 1 are explained.

The electromagnetic actuator 10 is a linear solenoid, and has a stator 11, a plunger 12, a shaft 13, and a coil 14.

The stator 11 has a cylindrical shape and is made of magnetic material such as iron. The stator 11 includes an accommodation part 111 and a suction part 112. The accommodation part 111 accommodates the plunger 12 on the radially inner side. The suction part 112 is arranged between the pressure controlling part 20 and the accommodation part 111, and the electromagnetic power is generated between the suction part 112 and the plunger 12 so as to attract the plunger 12.

The plunger 12 is made of magnetic material such as iron, and has a pillar shape. The plunger 12 is accommodated in the accommodation part 111, and is able to reciprocate in the axial direction. The shaft 13 is disposed between the pressure controlling part 20 and the plunger 12, and is able to reciprocate on the inner side of the suction part 112.

The coil 14 is installed on the outer side of the accommodation part 111 in the radial direction. The instruction current output from the TCU 8 is supplied to the coil 14 via a terminal 15. When the instruction current is supplied to the coil 14, magnetic flux is generated according to the instruction current. The magnetic flux passes the stator 11 and the plunger 12, and electromagnetic attraction power is generated between the suction part 112 and the plunger 12. Due to the electromagnetic attraction power, the plunger 12 and the shaft 13 are moved toward the pressure controlling part 20.

The pressure controlling part 20 is a spool valve, and includes a sleeve 21 and a spool 22.

The sleeve 21 has a cylindrical shape having the same axis as the stator 11. The sleeve 21 has plural radial passages passing through the sleeve 21 in the radial direction between outside and inside. Specifically, the sleeve 21 has a feedback passage 213, an input passage 211, an output passage 212, and a discharge passage 214 in this order from the side of the electromagnetic actuator 10, as shown in FIG. 1. The sleeve 21 has an axial end connected to the actuator 10, and the biasing force adjustment part 30 is connected to the other axial end opposite from the actuator 10.

The input passage 211 is connected with the pump 7 through a connection passage 61. The operation oil adjusted to have the predetermined line pressure is supplied to the input passage 211 from the pump 7.

The output passage 212 is connected with the clutch 6 through the connection passage 62. The output passage 212 outputs the operation oil adjusted to have the output oil pressure into the clutch 6.

A connection passage 64 branched from the connection passage 62 is connected the feedback passage 213. Some of the operation oil outputted from the output passage 212 is returned to inside the sleeve 21 through the feedback passage 213.

The discharge passage 214 is connected with the oil pan 65 through a connection passage 63. The discharge passage 214 discharges the excess operation oil to the oil pan 65, which is generated when adjusting the oil pressure.

The spool 22 is accommodated in the sleeve 21 and is able to reciprocate in the axial direction of the sleeve 21. As shown in FIG. 1, the spool 22 has a feedback land 223, an input land 221, and a discharge land 222 in this order from the side of the shaft 13. The shaft 13 of the actuator 10 contacts the spool 22 at or adjacent to the feedback land 223. The positions of the feedback land 223, the input land 221, and the discharge land 222 are controlled relative to the feedback passage 213, the input passage 211, the output passage 212, and the discharge passage 214, such that the spool 22 causes the passages to communicate with each other or to be disconnected from each other.

The biasing force adjustment part 30 includes a housing 31 as a cylindrical component, a pressure receiving part 32 as a reciprocate component, a spring 33 as a biasing portion, and an adjuster screw 34 as a biasing force adjustment component.

Figure 2A:
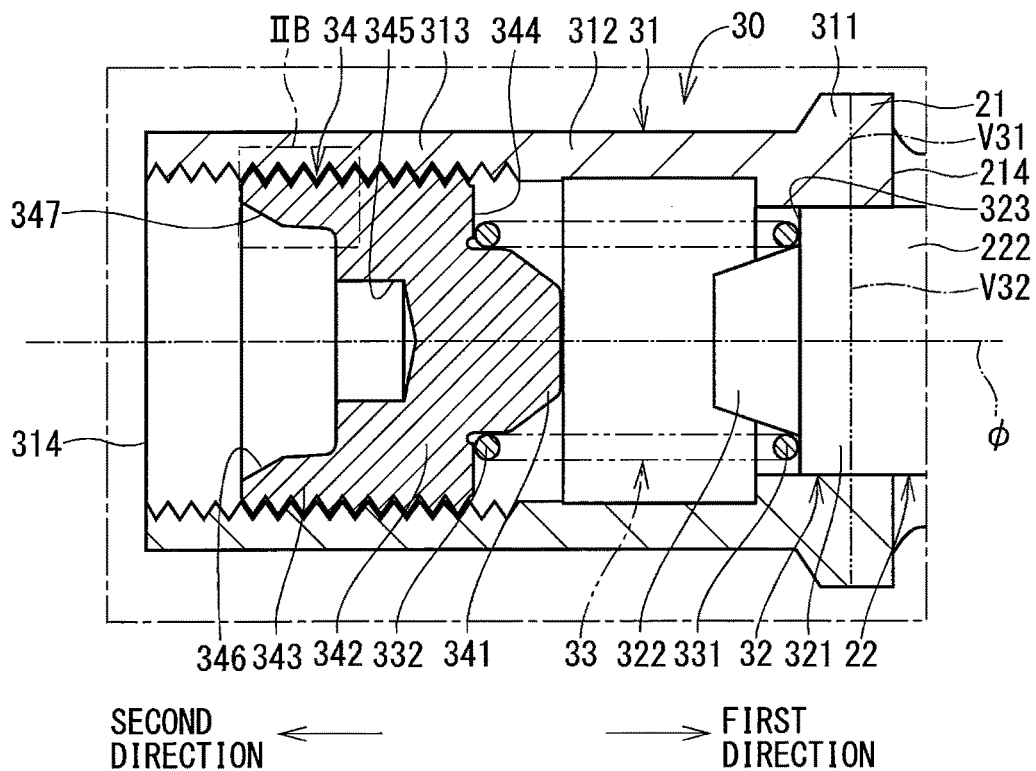
FIG. 2A is a sectional view of the biasing force adjustment device of the first embodiment.

The housing 31 has a cylindrical shape. In the first embodiment, the housing 31 has the same central axis φ as the sleeve 21, and is integrally formed with the sleeve 21 as one-piece component. In FIGS. 1 and 2A, a virtual line V31 shown in two-point chain line represents the boundary between the sleeve 21 and the housing 31 for convenience.

Figure 4A:
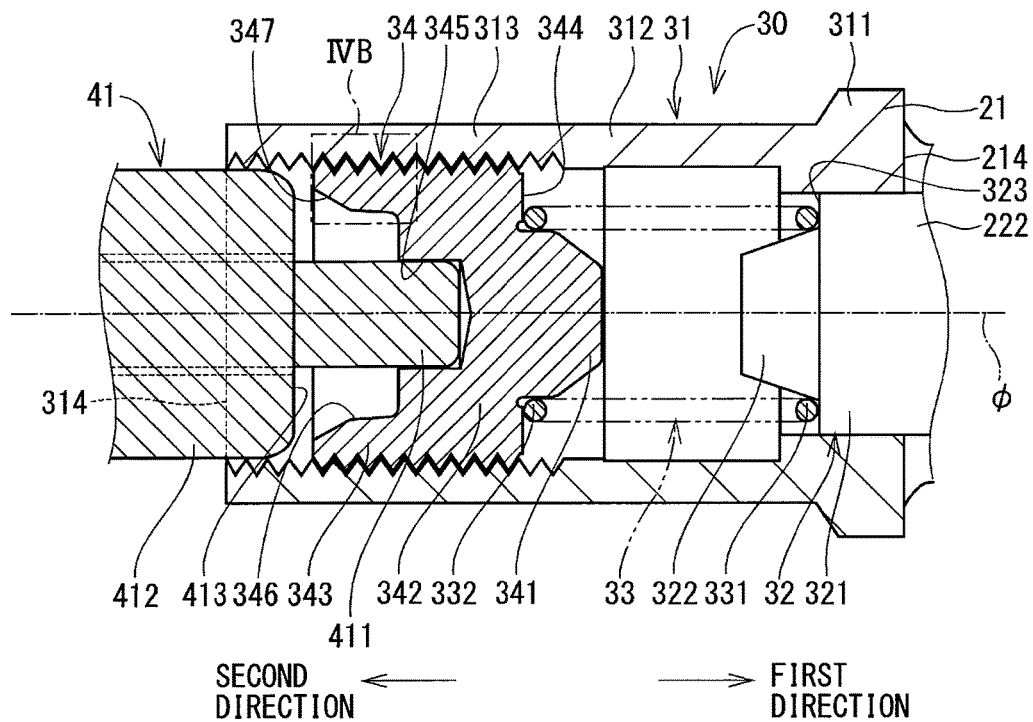
FIG. 4A is a view explaining a process in the method of producing the biasing force adjustment device of the first embodiment.
Figure 5A:
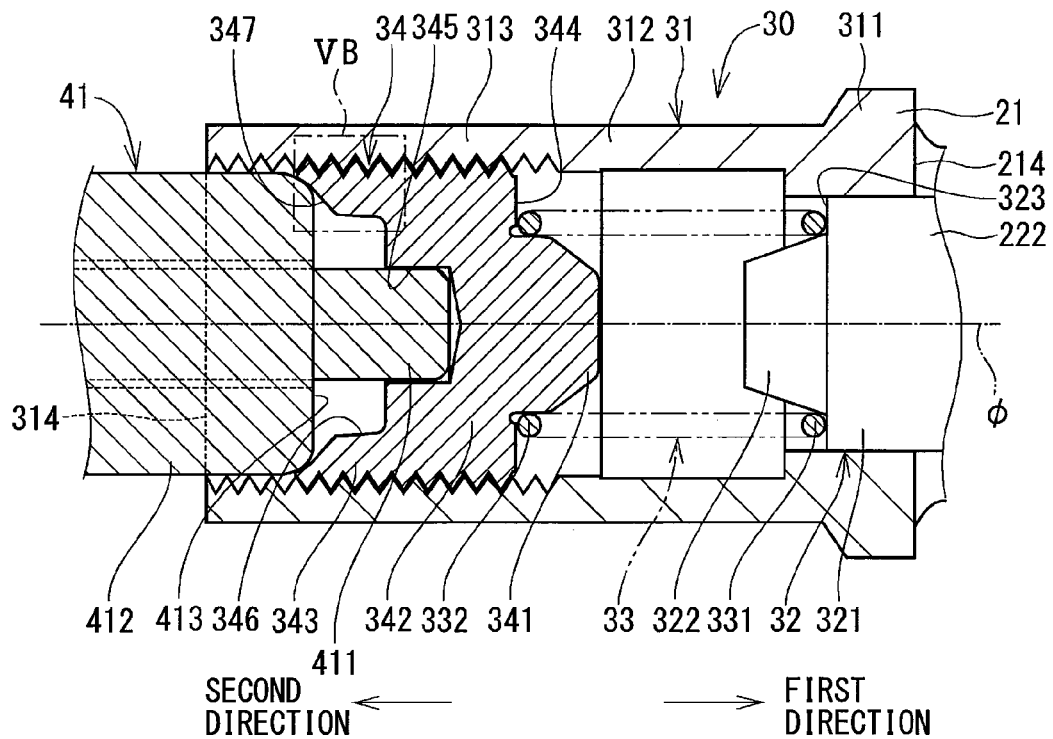
FIG. 5A is a view explaining a process in the method of producing the biasing force adjustment device of the first embodiment.

The housing 31 has an opening 314 through which the spool 22, the spring 33, and the adjuster screw 34 are inserted, at the end away from the sleeve 21. The housing 31 includes a first pipe part 311, a second pipe part 312, and a female thread part 313 as a first thread part. In FIGS. 2A, 4A, and 5A, the spring 33 biases the pressure receiving part 32 toward the spool 22 (rightward) in the first direction, and a direction opposite from the first direction is defined as a second direction (leftward).

The first pipe part 311 is connected to the other end of the sleeve 21 away from the actuator 10. The pressure receiving part 32 is arranged inside the first pipe part 311.

The second pipe part 312 is connected to the other end of the first pipe part 311 away from the sleeve 21. The inside diameter of the second pipe part 312 is larger than the inside diameter of the first pipe part 311. The spring 33 is arranged inside the second pipe part 312.

The female thread part 313 is connected to the other end of the second pipe part 312 away from the first pipe part 311. The adjuster screw 34 has a male thread part 342 as a second thread part. The female thread part 313 has a female thread on the inner wall, and the female thread is engaged with the male thread part 342.

The pressure receiving part 32 has a pillar part 321 having a column shape and a stopper part 322 having a truncated cone shape. The pillar part 321 and the stopper part 322 are integrally formed as the discharge land 222 of the spool 22 as one-piece component. In FIGS. 1 and 2A, a virtual line V32 shown in two-point chain line represents the boundary between the discharge land 222 and the pressure receiving part 32 for convenience. The biasing force of the spring 33 acts on the pressure receiving part 32.

The pillar part 321 has an outside diameter that is the same as the outside diameter of the discharge land 222. The pillar part 321 reciprocates and slides on the inner wall of the sleeve 21 or the housing 31 according to the movement of the spool 22.

The stopper part 322 is connected to the other end of the pillar part 321 away from the discharge land 222. The pillar part 321 has an end surface 323 adjacent to the adjuster screw 34. A first end 331 of the spring 33 is in contact with the end surface 323. The stopper part 322 regulates the movement of the first end 331 of the spring 33 in the radial direction.

The spring 33 is a biasing component that biases the pressure receiving part 32 and the adjuster screw 34 to separate from each other. The first end 331 of the spring 33 is supported by the radially outer side of the stopper part 322. A second end 332 of the spring 33 is supported by the adjuster screw 34.

The adjuster screw 34 integrally includes a stopper part 341, a male thread part 342, and a regulation part 343 as one-piece component. In the manufacturing process of the control valve 1, the adjuster screw 34 adjusts the biasing force generated by the spring 33 that is located between the pressure receiving part 32 and the adjuster screw 34, by adjusting the position of the adjuster screw 34 relative to the housing 31. The male thread part 342 has an end surface 344 adjacent to the pressure receiving part 32, and the second end 332 of the spring 33 is in contact with the end surface 344. The stopper part 341 regulates the movement of the second end 332 of the spring 33 in the radial direction.

The male thread part 342 has an approximately pillar shape. The male thread part 342 has a male thread on the radially outer side, and the male thread is engaged with the female thread of the female thread part 313 of the housing 31. The male thread part 342 has a pillar-shaped insertion hole 345 at the other axial end opposite from the stopper part 341. An adjustment part 411 of a tool 41 for adjusting the biasing force that is used in the manufacturing process of the control valve 1 is inserted in the insertion hole 345.

Figure 2B:
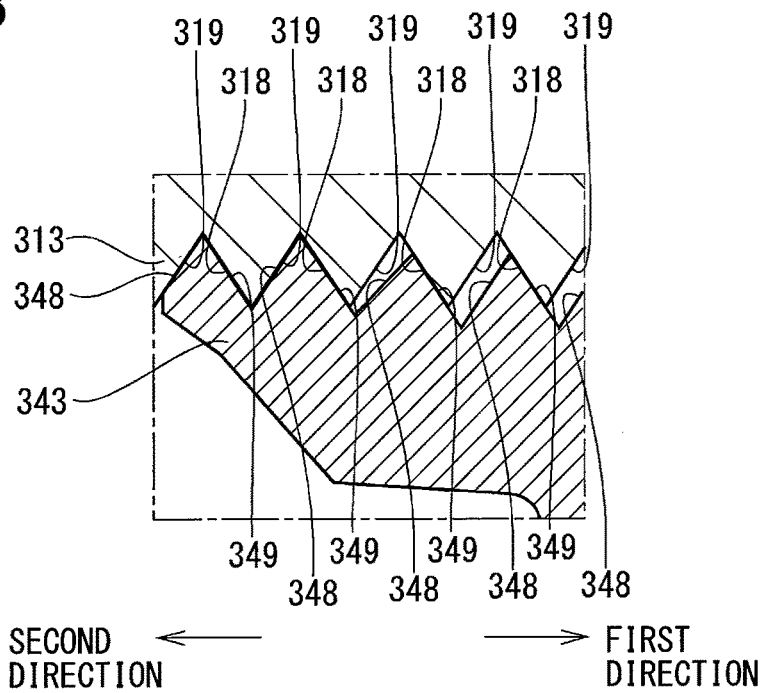
FIG. 2B is an enlarged view of an area IIB in FIG. 2A.

The regulation part 343 has a cylindrical shape, and is connected to the other axial end of the male thread part 342 opposite from the stopper part 341. The regulation part 343 has the male thread continued from the male thread of the male thread part 342, on the radially outer side. As shown in FIG. 2B, a part of the male thread of the regulation part 343 is fitted to the female thread of the female thread part 313.

Specifically, as shown in FIG. 2B, the regulation part 343 of the biasing force adjustment part 30 has four threads that are constructed by alternately arranging a flank 348 and a flank 349. The female thread of the female thread part 313 is also formed by alternately arranging a flank 319 and a flank 318. In other words, the thread of the male thread is constructed by the flank 348 located on the side in the second direction and the flank 349 located on the side in the first direction. The thread of the female thread is constructed by the flank 319 located on the side in the second direction and the flank 318 located on the side in the first direction.

At this time, the flank 348 and the flank 349 of the male thread of the regulation part 343 perfectly mesh and contact with the flank 319 and the flank 318 of the female thread part 313, respectively, at two threads located on the side in the second direction, among the four threads of the regulation part 343. At the other two threads located on the side in the first direction, the flank 348 of the male thread of the regulation part 343 is not in contact with the flank 319 of the female thread part 313, while the flank 349 of the male thread of the regulation part 343 is in contact with the flank 318 of the female thread part 313.

The regulation part 343 has an insertion hole 346 on the radially inner side. The inside diameter of the insertion hole 346 is larger than the inside diameter of the insertion hole 345. The regulation part 343 has a slope surface 347 at the edge of the insertion hole 346 adjacent to the opening 314. The slope surface 347 is inclined relative to the central axis φ. The sloped surface 347 has an inclined angle greater than an inclined angle for the second insertion hole 346, prior to said deformation in the radial direction by the external force. The sloped surface 347 is formed to separate from the central axis φ, as extending in the second direction.

Figure 3:
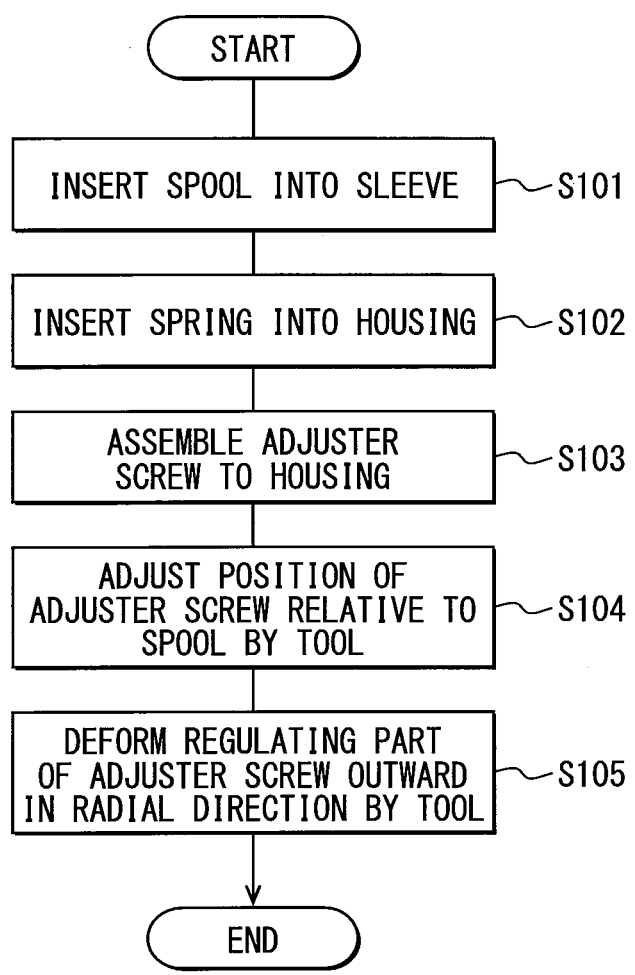
FIG. 3 is a flow chart explaining a method of producing the biasing force adjustment device of the first embodiment.

The production method of the control valve 1 is explained. FIG. 3 represents the flow chart explaining a process of adjusting the biasing force of the spring 33 by the biasing force adjustment part 30, in the manufacturing process of the control valve 1.

At S101, the spool 22 is inserted into the sleeve 21 from the opening 314. The spool 22 is inserted such that the feedback land 223 is made in contact with the shaft 13 of the actuator 10 connected to the sleeve 21.

At S102, the spring 33 is inserted into the housing 31 from the opening 314. The spring 33 is inserted such that the first end 331 is made in contact with the pressure receiving part 32 connected to the sleeve 21.

At S103, the adjuster screw 34 is assembled to the housing 31. The adjuster screw 34 is inserted into the housing 31 from the opening 314, and is made in contact with the second end 332 of the spring 33, while the male thread of the male thread part 342 and the female thread of the female thread part 313 of the housing 31 are engaged with each other.

S104 corresponds to a biasing force adjustment process, in which the position of the adjuster screw 34 relative to the sleeve 21 is adjusted using the biasing force adjustment tool 41. The structure of the tool 41 is explained based on FIG. 4. The tool 41 includes an adjustment part 411 as a device for adjusting position and a deforming part 412. The adjustment part 411 and the deforming part 412 have the same axis, and are movable in the axial direction independently from each other.

The adjustment part 411 applies a rotation torque to the adjuster screw 34. For example, the adjustment part 411 may be a screw driver having an approximately stick shape, as shown in FIG. 4A. When the adjustment part 411 is inserted in the insertion hole 345 of the adjuster screw 34, the adjustment part 411 is engaged with the inner wall of the male thread part 342 that defines the insertion hole 345.

The deforming part 412 has an approximately pipe shape, and is located on the radially outer side of the adjustment part 411. The outside diameter of the deforming part 412 is smaller than the inside diameter of the opening 314 of the housing 31 and the inside diameter of the female thread part 313, and is larger than the inside diameter of the insertion hole 346 of the regulation part 343 of the adjuster screw 34. When the deforming part 412 is inserted into the housing 31 and is moved in the first direction toward the spool, the edge of the end surface 413 of the deforming part 412 adjacent to the adjuster screw 34 is in contact with the regulation part 343.

At S104, as shown in FIG. 4A, the adjustment part 411 of the tool 41 that is inserted in the housing 31 is further inserted into the insertion hole 345. When the adjustment part 411 is rotated around the central axis φ by engaging with the inner wall of the male thread part 342, the position of the adjuster screw 34 relative to the housing 31 is changed. Therefore, the distance between the pressure receiving part 32 which supports the end of the spring 33 and the adjuster screw 34 changes, such that the biasing force which acts on the spool 22 connected to the pressure receiving part 32 is adjusted.

Figure 4B:
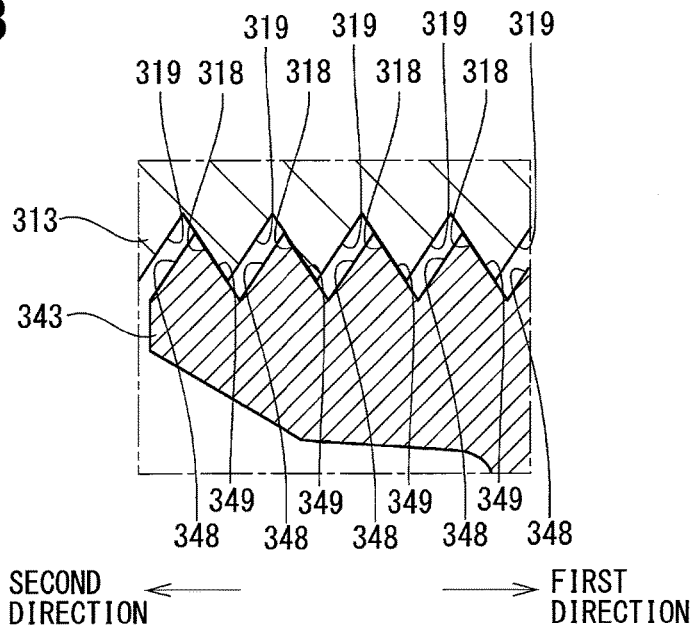
FIG. 4B is an enlarged view of an area IVB in FIG. 4A.

FIG. 4B illustrates the positional relationship between the male thread of the regulation part 343 of the adjuster screw 34 and the female thread of the female thread part 313 of the housing 31 in S104.

At S104, the adjustment part 411 applies the force on the adjuster screw 34 in the first direction toward the spool against the biasing force of the spring 33. Thereby, as shown in FIG. 4B, the flank 349 of the regulation part 343 and the flank 318 of the female thread part 313 are in contact with each other, while a clearance is generated between the flank 348 of the regulation part 343 and the flank 319 of the female thread part 313.

At S105 corresponding to a deforming process, the regulation part 343 of the adjuster screw 34 is deformed outward in the radial direction using the tool 41 for adjusting the biasing force. As shown in FIG. 5A, while the adjustment part 411 applies the force to the adjuster screw 34 in the first direction against the biasing force of the spring 33, the deforming part 412 of the tool 41 is moved in the first direction toward the spool, such that the edge of the end surface 413 of the deforming part 412 is made in contact with the slope surface 347 of the adjuster screw 34.

Figure 5B:
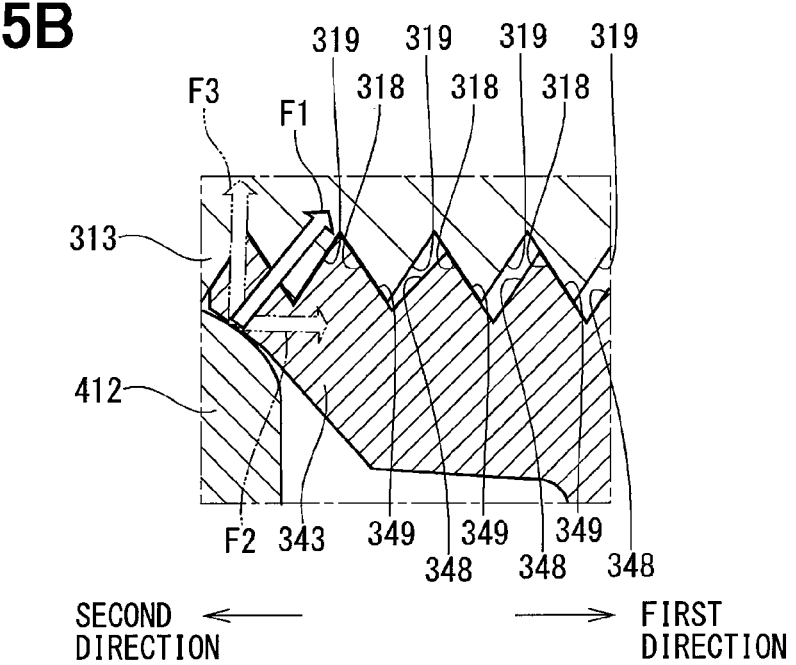
FIG. 5B is an enlarged view of an area VB in FIG. 5A.

When the deforming part 412 is made in contact with the slope surface 347 of the adjuster screw 34, a part of the regulation part 343 of the adjuster screw 34 is deformed outward in the radial direction. Due to the deformation of the regulation part 343, as shown in FIG. 5B, the flank 349 of the regulation part 343 and the flank 318 of the female thread part 313 are in contact with each other, and the flank 348 of the regulation part 343 and the flank 319 of the female thread part 313 are in contact with each other. Thereby, the position of the adjuster screw 34 relative to the housing 31 is fixed, and the adjustment in the biasing force of the spring 33 is completed.

Operations of the control valve 1 are explained.

When the drive current is not supplied to the actuator 10 of the control valve 1, the spool 22 receiving the biasing force of the spring 33 is in the state shown in FIG. 1. In this state, since the input passage 211 is closed by the input land 221 of the spool 22, operation oil is not supplied into the sleeve 21 by the pump 7.

When the drive current is supplied to the actuator 10 of the control valve 1, electromagnetic attraction power is generated in the actuator 10. The shaft 13 and the spool 22 move rightward in FIG. 1, and the input passage 211 is communicated with the sleeve 21. The operation oil supplied from the pump 7 through the input passage 211 is supplied to the clutch 6 through the sleeve 21, the output passage 212 and the connection passage 62. At this time, the pressure of the operation oil supplied to the clutch 6 is determined by the position of the spool 22 relative to the sleeve 21. In other words, the pressure of the operation oil supplied to the clutch 6 is determined by the balance between the biasing force of the spring 33 and the electromagnetic attraction power generated by the actuator 10.

With reference to FIGS. 8A-10B, a comparative example is explained relative to the control valve 1 having the biasing force adjustment part 30 of the first embodiment. In the comparative example, a control valve is equipped with a biasing force adjustment part having an adjuster screw, and the adjuster screw does not have a regulation part that is deformable outward in the radial direction. A process of adjusting a biasing force of a spring in the comparative example is explained based on FIGS. 8A and 8B.

A biasing force adjustment part 70 of the comparative example includes a housing 71, a pressure receiving part 72 connected to the spool 22, a spring 73, and an adjuster screw 74.

Figure 8A:
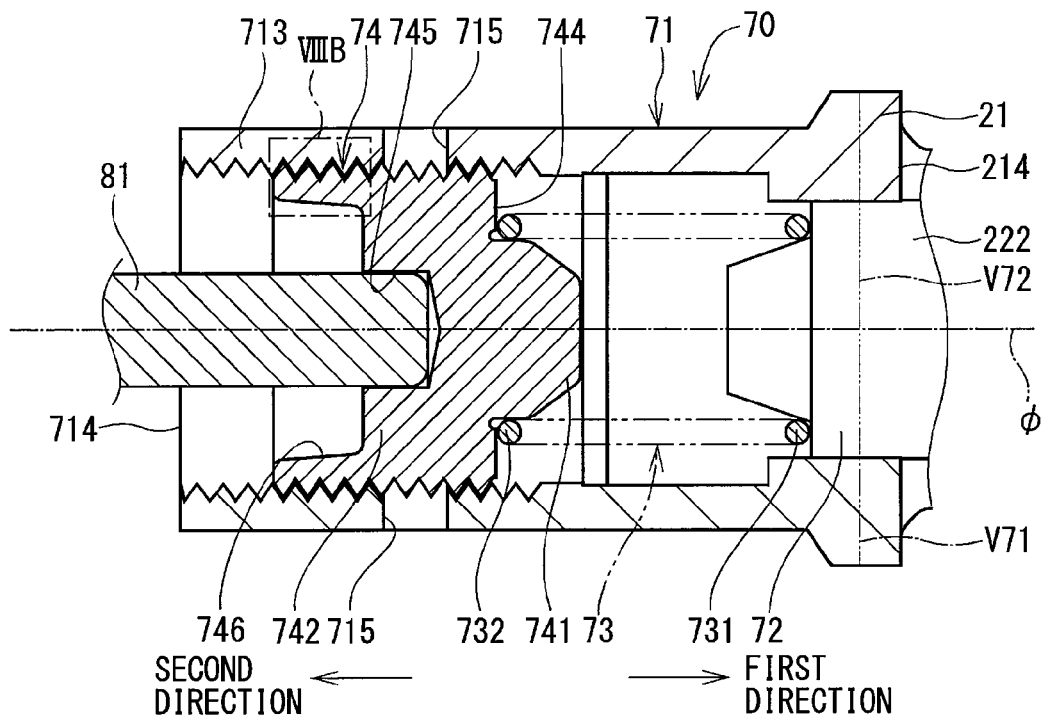
FIG. 8A is a view explaining a process in a method of producing a biasing force adjustment device of a comparison example.

The housing 71 has a cylindrical shape, and is integrally formed as the sleeve 21 as one-piece component to have the same central axis. In FIG. 8A, a virtual line V71 shown in a two-point chain line represents the boundary between the sleeve 21 and the housing 71 for convenience. The male thread of the male thread part 742 of the adjuster screw 74 is engaged with the female thread formed on the inner wall of the female thread part 713 of the housing 71. The female thread part 713 has a penetration hole 715 through which a deforming tool 82 is inserted in the radial direction.

The pressure receiving part 72 is integrally formed with the discharge land 222 of the spool 22. A virtual line V72 shown in a two-point chain line in FIG. 8A represents the boundary between the discharge land 222 and the pressure receiving part 72 for convenience.

The spring 73 is a biasing component which biases the pressure receiving part 72 and the adjuster screw 74 to separate from each other. The first end 731 of the spring 73 is supported by the pressure receiving part 72. The second end 732 of the spring 73 is supported by the adjuster screw 74.

The adjuster screw 74 integrally has the stopper part 741 and the male thread part 742. The second end 732 of the spring 73 is in contact with the end surface 744 of the male thread part 742 adjacent to the pressure receiving part 72. The stopper part 741 regulates the second end 732 of the spring 73 from moving in the radial direction.

The male thread part 742 has a based cylindrical shape. The male thread part 742 has the male thread engaged with the female thread of the female thread part 713 of the housing 71, on the radially outer side. The pillar-shaped insertion hole 745 is formed at the other axial end opposite from the stopper part 741. The insertion hole 745 communicates to outside of the adjuster screw 74 through the insertion hole 746. The tool 81 for adjusting the biasing force that is used in the manufacturing process of the control valve of the comparative example is inserted in the insertion hole 745.

The production method of the control valve of the comparative example is explained.

The spool 22 is inserted in the sleeve 21 connected with the electromagnetic actuator (not shown). The spring 73 is inserted in the housing 71 so that the first end 731 is in contact with the pressure receiving part 72. Then, the adjuster screw 74 is attached in the housing 71.

Figure 8B:
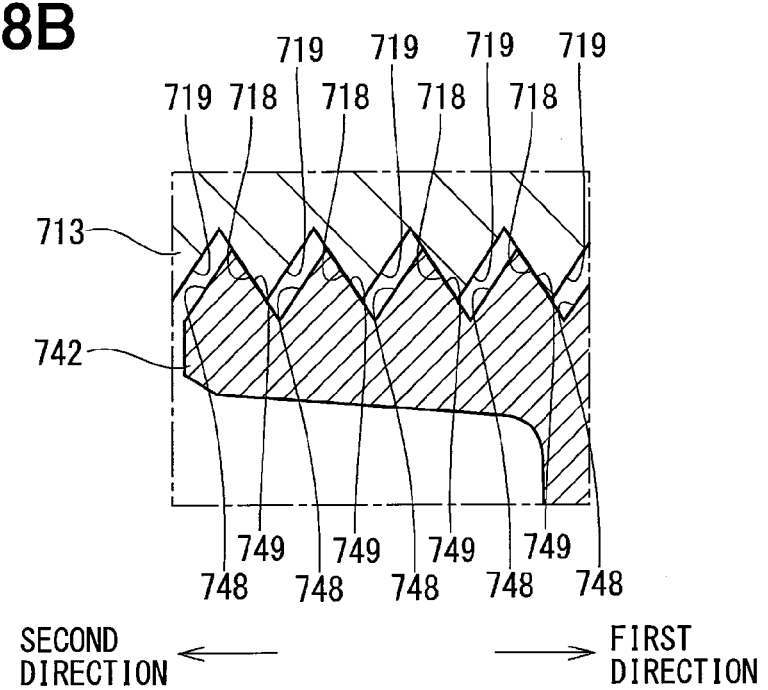
FIG. 8B is an enlarged view of an area VIIIB in FIG. 8A.

As shown in FIG. 8A, the tool 81 is inserted in the insertion hole 745. The tool 81 applies rotation torque on the adjuster screw 74 similarly to the adjustment part 411 of the tool 41 of the first embodiment, and is may be a screw driver. The tool 81 is rotated around the central axis φ, by being engaged with the inner wall that defines the insertion hole 745, such that the position of the adjuster screw 74 is adjusted relative to the housing 71. FIG. 8B shows the positional relationship, at this time, between the male thread of the male thread part 742 of the adjuster screw 74 and the female thread of the female thread part 713 of the housing 71. Since the tool 81 applies the power to the adjuster screw 74 toward the spool in the first direction, the flank 718 of the female thread part 713 and the flank 749 of the male thread part 742 are in contact with each other, and a clearance is defined between the flank 719 of the female thread part 713 and the flank 748 of the male thread part 742.

Figure 9A:
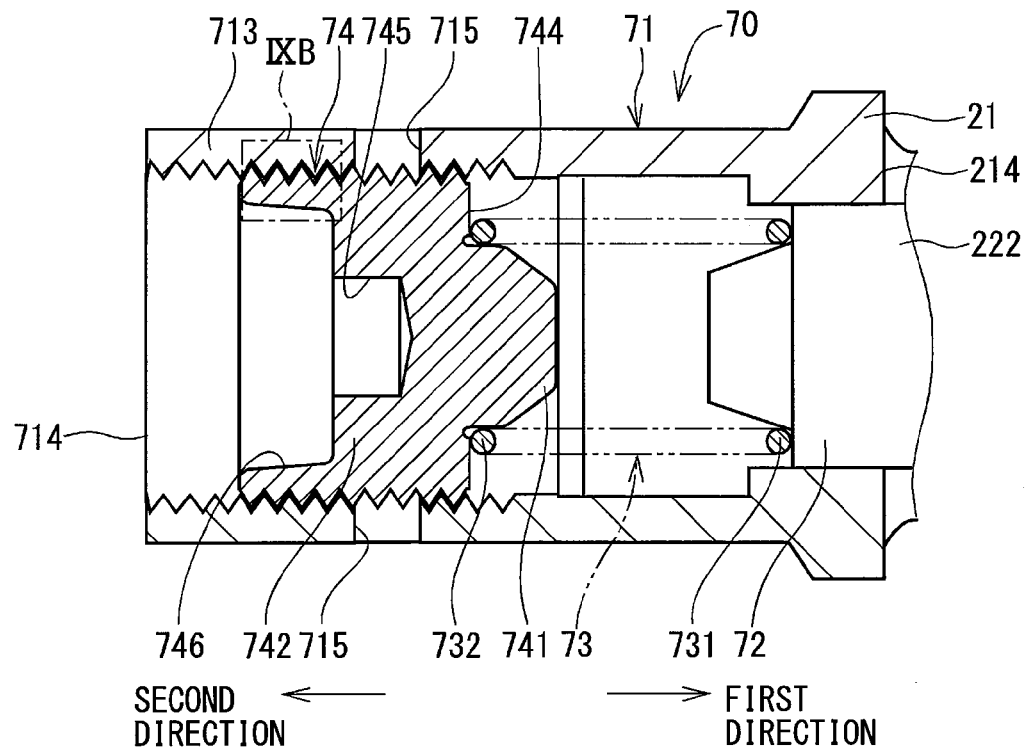
FIG. 9A is a view explaining a process in the method of producing the biasing force adjustment device of the comparison example.
Figure 9B:
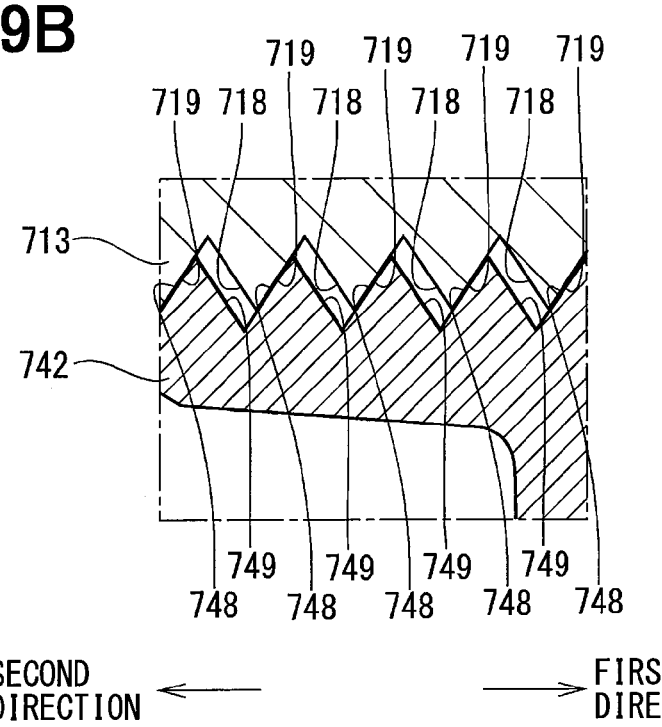
FIG. 9B is an enlarged view of an area IXB in FIG. 9A.

After adjusting the position of the adjuster screw 74 relative to the housing 71, if the tool 81 is separated from the adjuster screw 84, the power of the tool 81 acting on the adjuster screw 74 in the first direction is canceled. For this reason, as shown in FIG. 9B, the adjuster screw 74 is moved in the second direction toward the opening by the biasing force of the spring 73. Specifically, the flank 719 of the female thread part 713 and the flank 748 of the male thread part 742 are in contact with each other, and a clearance is defined between the flank 718 of the female thread part 713 and the 749 of the male thread part 742. That is, the adjuster screw 74 moves from the position at which the biasing force of the spring 73 is adjusted to have a predetermined value.

Figure 10A:
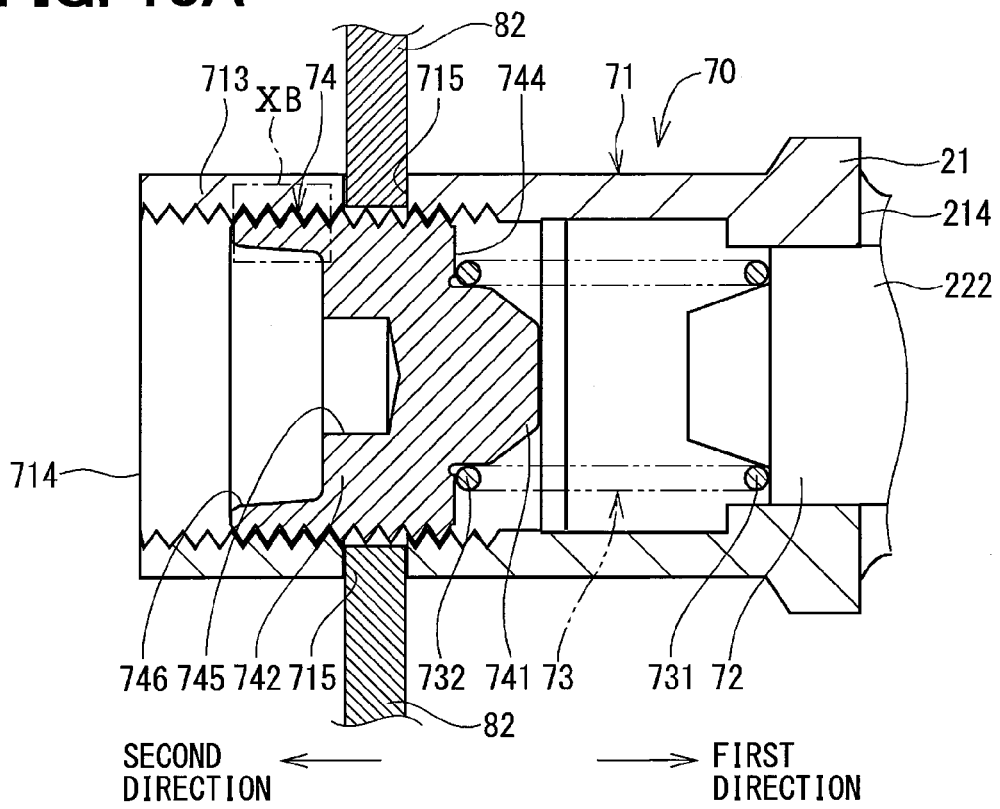
FIG. 10A is a view explaining a process in the method of producing the biasing force adjustment device of the comparison example.
Figure 10B:
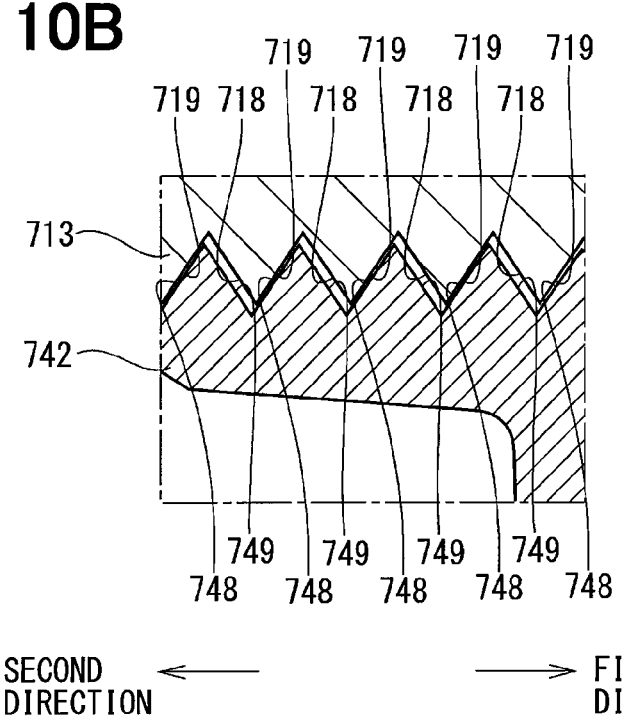
FIG. 10B is an enlarged view of an area XB in FIG. 10A.

As shown in FIG. 10A, after the tool 81 is removed from the adjuster screw 84, the deforming tool 82 is inserted in the penetration hole 715 of the housing 71 in the radial direction. The deforming tool 82 deforms the male thread of the male thread part 742 of the adjuster screw 74, and the position of the adjuster screw 74 is fixed relative to the housing 71.

However, the adjuster screw 74 may move in the first direction or the second direction depending on the insertion direction of the deforming tool 82 or the spatial relationship between the flank 718, 719 of the female thread part 713 of the housing 71 and the flank 748, 749 of the male thread part 742 of the adjuster screw 74. For this reason, the position of the adjuster screw 74 relative to the housing 71 can be further deviated. In this case, the spring 73 cannot apply a desired biasing force on the pressure receiving part 72.

According to the biasing force adjustment part 30 of the first embodiment, after adjusting the position of the adjuster screw 34 relative to the housing 31, the regulation part 343 is deformed outward in the radial direction while the adjustment part 411 applies the force on the adjuster screw 34 in the first direction, such that the position of the adjuster screw 34 is fixed relative to the housing 31. At this time, since the force deforming the regulation part 343 is applied in the same direction as the force applied by the adjustment part 411 to the adjuster screw 34, the position of the adjuster screw 34 relative to the housing 31 can be restricted from being deviated, while the force deforming the regulation part 343 is applied. The same direction means both of just the same and approximately the same in the manufacturing process of the control valve 1. Thus, the adjuster screw 34 can be fixed without a change in the position relative to the housing 31. Therefore, the biasing force of the spring 33 can be adjusted with sufficient accuracy.

According to the first embodiment, the adjuster screw 34 has the slope surface 347 which is inclined to the central axis. When a force is applied to the slope surface 347 in the first direction from the deforming part 412, as shown in FIG. 5B, the force F1 acts on the slope surface 347. When the force F1 is decomposed into an axial force F2 in the direction of the central axis 4) and the radial force F3 in the radial direction, the axial force F2 that acts in the first direction does not change the position of the adjuster screw 34 relative to the housing 31. In contrast, the radial force F3 deforms the regulation part 343 outward in the radial direction. Thus, the adjuster screw 34 can be fixed, without a change in the position of the adjuster screw 34 relative to the housing 31. Therefore, the biasing force of the spring 33 can be adjusted with sufficient accuracy.

Second Embodiment

Figure 6:
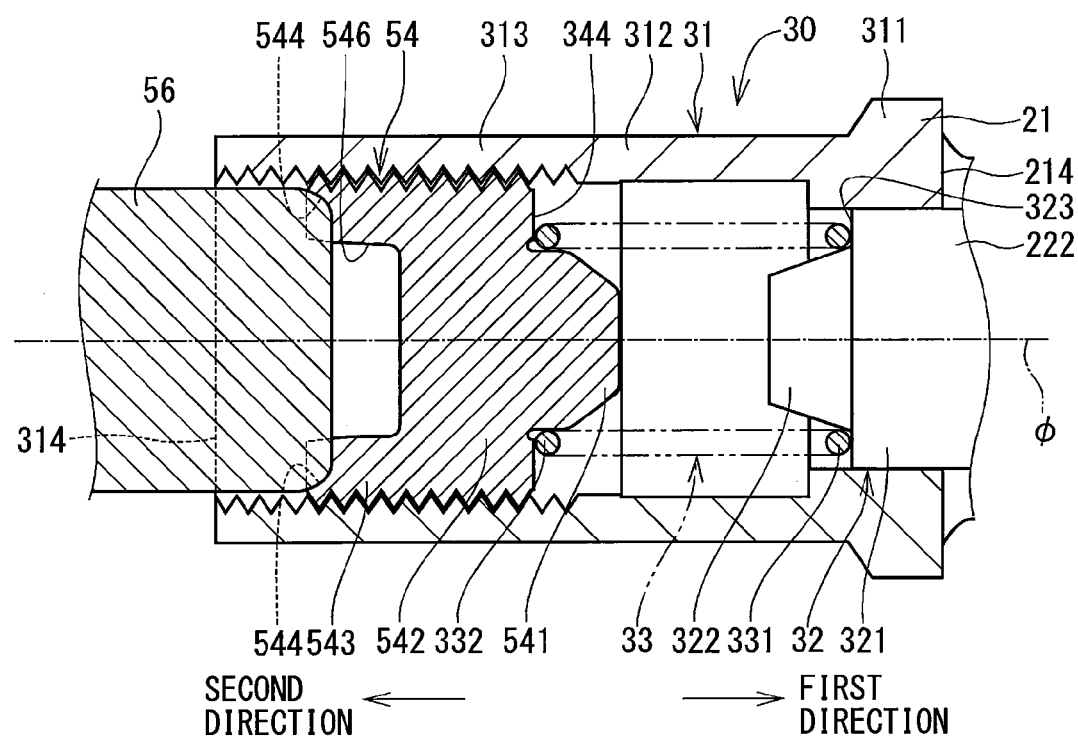
FIG. 6 is a sectional view illustrating a biasing force adjustment device according to a second embodiment.

A biasing force adjustment device according to a second embodiment is explained based on FIG. 6. The second embodiment differs from the first embodiment in the shape of the adjuster screw.

As shown in FIG. 6, the biasing force adjustment part 50 of the second embodiment includes the housing 31, the pressure receiving part 32, the spring 33, and the adjuster screw 54 as a biasing force adjustment component. The adjuster screw 54 integrally includes the stopper part 541, the male thread part 542 as a second thread part, and the regulation part 543. The second end 332 of the spring 33 is in contact with the end surface 344 of the male thread part 542 adjacent to the pressure receiving part 32. The stopper part 541 regulates the second end 332 of the spring 33 from moving in the radial direction. The male thread part 542 has an approximately pillar shape, and has the male thread on the radially outer side. The male thread of the male thread part 542 is engaged with the female thread of the female thread part 313 of the housing 31.

The regulation part 543 has a cylindrical shape, and has the male thread continued with the male thread of the male thread part 542, on the radially outer side. An interior space 546 is defined inside the regulation part 543 in the radial direction.

Figure 7A:
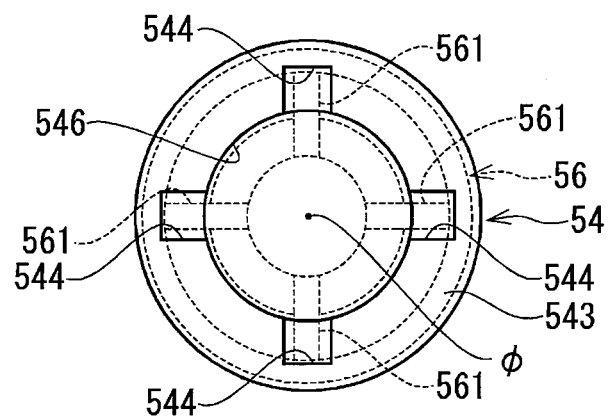
FIG. 7A is a side view illustrating an end surface of an adjuster screw of the biasing force adjustment device of the second embodiment.

FIG. 7A shows a view of the regulation part 543 seen from the side of the opening 314. The axial end portion of the regulation part 543 which defines the interior space 546 has plural slots 544 arranged in the circumferential direction. In the second embodiment, the biasing force adjustment part 50 has four slots 544.

Figure 7B:
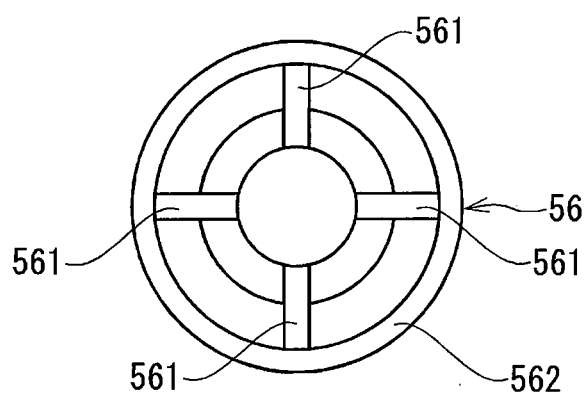
FIG. 7B is a schematic view illustrating a biasing force adjustment tool that is used in the method of producing the biasing force adjustment device of the second embodiment.

FIG. 7B shows a front view of the tool 56 for adjusting the biasing force as a position adjustment tool that is used when the biasing force adjustment part 50 adjusts the biasing force of the spring 33. The axial end of the tool 56 adjacent to the adjuster screw 54 has a projection 561 extending from the central axis outward in the radial direction. The tool 56 has four projections 561, and further has a contact part 562 on the radially outer side of the projection 561. The contact part 562 is able to contact the regulation part 543.

As shown in FIG. 7A, when the tool 56 is made in contact with the regulation part 543, the four projections 561 are inserted respectively into the four slots 544 of the regulation part 543. The tool 56 is rotated in the circumference direction around the central axis φ, while the projection 561 is engaged with the slot 544. At this time, the slot 544 is deformed while the position of the adjuster screw 54 is fixed relative to the housing 31.

According to the biasing force adjustment part 50 of the second embodiment, while the tool 56 adjusts the position of the adjuster screw 54, the slot 544 is deformed to spread by the projection 561. Thus, while the biasing force of the spring 33 is adjusted, the position of the adjuster screw 54 is fixed to the housing 31 simultaneously. The second embodiment can reduce the number of processes necessary for adjusting the biasing force of the spring 33, in addition to the advantages of the first embodiment. The position of the adjuster screw 54 relative to the housing 31 can be restricted from being deviated. Thus, the adjuster screw 54 can be fixed without a change in the position of the adjuster screw 54 relative to the housing 31. Therefore, the biasing force of the spring 33 can be adjusted with sufficient accuracy.

Other Embodiment

The biasing force adjustment part is not limited to adjust the biasing force which acts on the spool of the control valve. A component to which the biasing force is applied is not limited to the spool, and a component having the biasing force adjustment part is not limited to the control valve. The biasing force adjustment part adjusts a biasing force applied to a component that is accommodated in a cylindrical component and that is movable relative to the cylindrical component.

The biasing portion is not limited to a spring. The biasing portion may be other member that produces biasing force for a movable component.

In the embodiments, the regulation part of the adjuster screw has the male thread continued from the male thread of the male thread part, on the radially outer side. However, the male thread may not be formed on the radially outer side of the regulation part.

In the embodiments, the housing has the female thread part, and the adjuster screw has the male thread part. Further, the regulation part of the adjuster screw is deformed outward in the radial direction when a force is applied in the first direction. However, the relationship between the thread of the housing and the thread of the adjuster screw is not limited, and the deformation direction of the regulation part is not limited. The housing may have a male thread part, and the adjuster screw may have a female thread part. The engagement between the thread parts may be placed on the radially outer side of the housing.

Such changes and modifications are to be understood as being within the scope of the present disclosure as defined by the appended claims.

What is claimed is:

1. A biasing force adjustment device comprising:
a cylindrical component having a first thread;
a reciprocate component accommodated to reciprocate in the cylindrical component;
a biasing portion that biases the reciprocate component in a first direction along a central axis of the cylindrical component; and
a biasing force adjustment component that adjusts a biasing force of the biasing portion in the cylindrical component, wherein
the biasing force adjustment component has
a second thread engaged with the first thread so as to control the position of the biasing force adjustment component relative to the cylindrical component,
a regulation part that regulates movement of the biasing force adjustment component relative to the cylindrical component by being deformed in a radial direction by external force applied in the first direction,
the biasing force adjustment component has a first insertion hole configured to receive a position adjustment tool so that the position adjustment tool can apply a rotation torque around the central axis to the biasing force adjustment component, and
a stopper part projected inside of the biasing portion to regulate an end of the biasing portion from moving in the radial direction;
the first insertion hole is located on a side of the biasing force adjustment component opposite from the biasing portion through the biasing force adjustment component in the axial direction;
the regulation part has a second insertion hole having an inside diameter larger than an inside diameter of the first insertion hole;
the regulation part has a sloped surface at an edge of the second insertion hole adjacent to an opening of the regulation part; and
the sloped surface is inclined relative to the central axis, and is inclined away from the central axis in a second direction opposite from the first direction; wherein the sloped surface has an inclined angle greater than an inclined angle for the second insertion hole, prior to said deformation in the radial direction by the external force;
an outside diameter of the stopper part is larger than the inside diameter of the first insertion hole, and
the outside diameter of the stopper part is smaller than the inside diameter of the second insertion hole.

2. A method of manufacturing a biasing force adjustment device comprising:
adjusting a biasing force of a biasing portion applied to a reciprocate component by adjusting a position of a biasing force adjustment component relative to a cylindrical component, while a force is applied to the biasing force adjustment component in a first direction along a central axis of the cylindrical component against the biasing force of the biasing portion;
deforming the biasing force adjustment component in a radial direction by applying an external force on the biasing force adjustment component while a force is applied to the biasing force adjustment component against the biasing force of the biasing portion, after the adjusting of the biasing force;
inserting a position adjustment tool into a first insertion hole in the biasing force adjustment component; and
applying a rotation torque around the central axis to the biasing force adjustment component with the position adjustment tool; wherein
the first insertion hole is located on a side of the biasing force adjustment component opposite from the biasing portion through the biasing force adjustment component in the axial direction,
the biasing force adjustment component has a second insertion hole having an inside diameter larger than an inside diameter of the first insertion hole,
the biasing force adjustment component has a slope surface at an edge of the second insertion hole adjacent to an opening of the biasing force adjustment component,
the slope surface is inclined relative to the central axis, and is inclined away from the central axis in a second direction opposite from the first direction; wherein the sloped surface has an inclined angle greater than an inclined angle for the second insertion hole, prior to said deformation in the radial direction by the external force;
the biasing force adjustment component has a stopper part projected inside of the biasing portion to regulate an end of the biasing portion from moving in the radial direction,
an outside diameter of the stopper part is larger than the inside diameter of the first insertion hole, and
the outside diameter of the stopper part is smaller than the inside diameter of the second insertion hole.

* * * * *